(12) United States Patent
Bai et al.

(10) Patent No.: US 11,879,758 B2
(45) Date of Patent: Jan. 23, 2024

(54) MOBILE DEVICE INCLUDING IMPROVED ELECTRO-ACOUSTIC CONVERSION CHIP

(71) Applicant: AAC ACOUSTIC TECHNOLOGIES (SHENZHEN) CO., LTD., Shenzhen (CN)

(72) Inventors: Yang Bai, Shenzhen (CN); Yanxin Chen, Shenzhen (CN); Rui Zhang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 8 days.

(21) Appl. No.: 17/563,015

(22) Filed: Dec. 27, 2021

(65) Prior Publication Data

US 2022/0205820 A1 Jun. 30, 2022

(30) Foreign Application Priority Data

Dec. 30, 2020 (CN) .......................... 202011642988.3

(51) Int. Cl.
*G01F 1/05* (2006.01)
*H02K 41/02* (2006.01)

(52) U.S. Cl.
CPC ............... *G01F 1/05* (2013.01); *H02K 41/02* (2013.01)

(58) Field of Classification Search
None
See application file for complete search history.

(56) References Cited

U.S. PATENT DOCUMENTS

| 2020/0045426 A1* | 2/2020 | Song | ......................... | H04R 1/06 |
| 2020/0186930 A1* | 6/2020 | Xiao | ......................... | H04R 7/12 |

* cited by examiner

*Primary Examiner* — Brandi N Hopkins
*Assistant Examiner* — Nigel H Plumb
(74) *Attorney, Agent, or Firm* — W&G Law Group

(57) ABSTRACT

The present disclosure provides a linear motor including: a housing body with a containment space; a vibrator assembly suspended in the containment space by an elastic member for vibrating along a vibration direction; a stator assembly fixedly connected to the housing body and having a magnetic axis along the vibration direction; and two magnets located on both sides of the magnetic axis and spaced from the stator assembly, including a first magnet section and a second magnet section located on both sides of the first magnet section. A magnetic field strength of the first magnet section along the magnetic axis is greater than a magnetic field strength of the second magnet section along the magnetic axis. The configuration of the invention can effectively reduce the static attraction force of the magnetic circuit, and increase the overall rigidity of the linear motor.

13 Claims, 9 Drawing Sheets

US 11,879,758 B2

MOBILE DEVICE INCLUDING IMPROVED ELECTRO-ACOUSTIC CONVERSION CHIP

FIELD OF THE PRESENT DISCLOSURE

The invention relates to an electronic technical field, in particular to a sensor package, a manufacturing method of the sensor package and an electronic terminal incorporating the sensor package.

DESCRIPTION OF RELATED ART

In the related art, sensors have a wide range of application fields, such as MEMS (Micro-Electro-Mechanical System) microphones, MEMS ultrasonic transducers and other electro-acoustic sensors. An electro-acoustic conversion chip exists in the electro-acoustic sensor. Because the electro-acoustic conversion chip has movable parts, the vibration of the movable parts converts the sound signal and the electric signal through the vibration of the movable parts. When air exists in the electro-acoustic sensor, it forms air damping to the vibration of the movable parts, and the air damping becomes a key factor affecting the noise of cavity of the electro-acoustic sensor.

Therefore, it is necessary to provide a sensor package to solve the above problems.

SUMMARY OF THE PRESENT INVENTION

One of the objects of the present invention is to provide a sensor package which is enable to reduce the bad influence of air resistance and improve SNR (signal-to-noise ratio).

To achieve the above-mentioned objects, the present invention provides a sensor package, comprising: a package cover; an electro-acoustic conversion chip fixed to the package cover; a processing chip fixed on a surface of one side of the electro-acoustic conversion chip away from the package cover and electrically connected to the electro-acoustic conversion chip; a suction structure; an electrical connector electrically connected to the suction structure for activating the suction structure; a first cavity formed by the processing chip and the electro-acoustic conversion chip; and a second cavity formed by the package cover and the electro-acoustic conversion chip.

The processing chip includes a groove with an opening facing the electro-acoustic conversion chip for accommodating the suction structure, a first through hole communicating with the first cavity and at least partially receiving the electrical connector; the package cover and the acoustic conversion chip are connected to form a second cavity. The package cover includes a second through hole communicating with the second cavity.

In addition, the sensor package further includes a first connection structure; wherein the processing chip comprises a first perimeter surrounding the groove; the electro-acoustic conversion chip comprises a second perimeter opposite to the first perimeter; the first connection structure is connected to the first perimeter and the second perimeter, respectively; the processing chip, the first connection structure, and the acoustic conversion chip enclose cooperatively for forming the first cavity.

In addition, the sensor package further includes a second connection structure, wherein the electro-acoustic conversion chip further comprises a third perimeter; the third perimeter and the second perimeter are respectively located on opposite sides of the electro-acoustic conversion chip; the package cover comprises a fourth perimeter surrounding the second through hole; the second connection structure is connected to the third perimeter and the fourth perimeter respectively; the package cover, the second connection structure, and the acoustic conversion chip enclose cooperatively for forming the second cavity.

In addition, the electro-acoustic conversion chip comprises a main body connected to the first connection structure, and a sidewall connected to a periphery of the main body for connecting to the second connection structure.

In addition, the electro-acoustic conversion chip comprises a main body connected to the first connection structure, and a sidewall connected to a periphery of the main body for connecting to the first connection structure.

In addition, the first connection structure comprises a first soldering pad connected to the processing chip, a second soldering pad connected to the electro-acoustic conversion chip, and a first solder connecting the first soldering pad and the second soldering pad.

The present invention further provides a method for making a sensor package comprising steps of:
  providing a processing chip with a groove and a first through hole;
  providing an electrical connector in the first through hole;
  providing a suction structure located in the groove and connecting to the electrical connector;
  providing an electro-acoustic conversion chip at one side of the processing chip with the groove for forming a first cavity;
  providing a package cover arranged on a surface of the electro-acoustic conversion chip away from the processing chip and electrically connected to the electro-acoustic conversion chip for forming a second cavity; wherein
  the package cover includes a second through hole communicating with the second cavity.

In addition, the processing chip comprises a first perimeter surrounding the groove; the electro-acoustic conversion chip comprises a second perimeter opposite to the first perimeter; and wherein after the step of providing the electro-acoustic conversion chip, the method further comprises steps of:
  providing a first connection structure;
  connecting the first connection structure to the first perimeter and the second perimeter respectively; wherein the processing chip, the acoustic conversion chip, and the first connection structure cooperatively enclose for forming the first cavity.

In addition, the acoustic conversion chip comprises a third perimeter; the third perimeter and the second perimeter are respectively located on opposite sides of the electro-acoustic conversion chip; the package cover comprises a fourth perimeter surrounding the second through hole; and wherein after step of providing the package cover, the method further includes the steps of:
  providing a second connection structure;
  connecting the second connection structure to the third perimeter and the fourth perimeter respectively; the package cover, the electro-acoustic conversion chip, and the second connection structure are jointly enclosed for forming the second cavity.

The present invention further provides an electronic terminal comprising a sensor package described above.

BRIEF DESCRIPTION OF THE DRAWINGS

Many aspects of the exemplary embodiments can be better understood with reference to the following drawings.

The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby is only to explain the disclosure, not intended to limit the disclosure.

Figure 1:
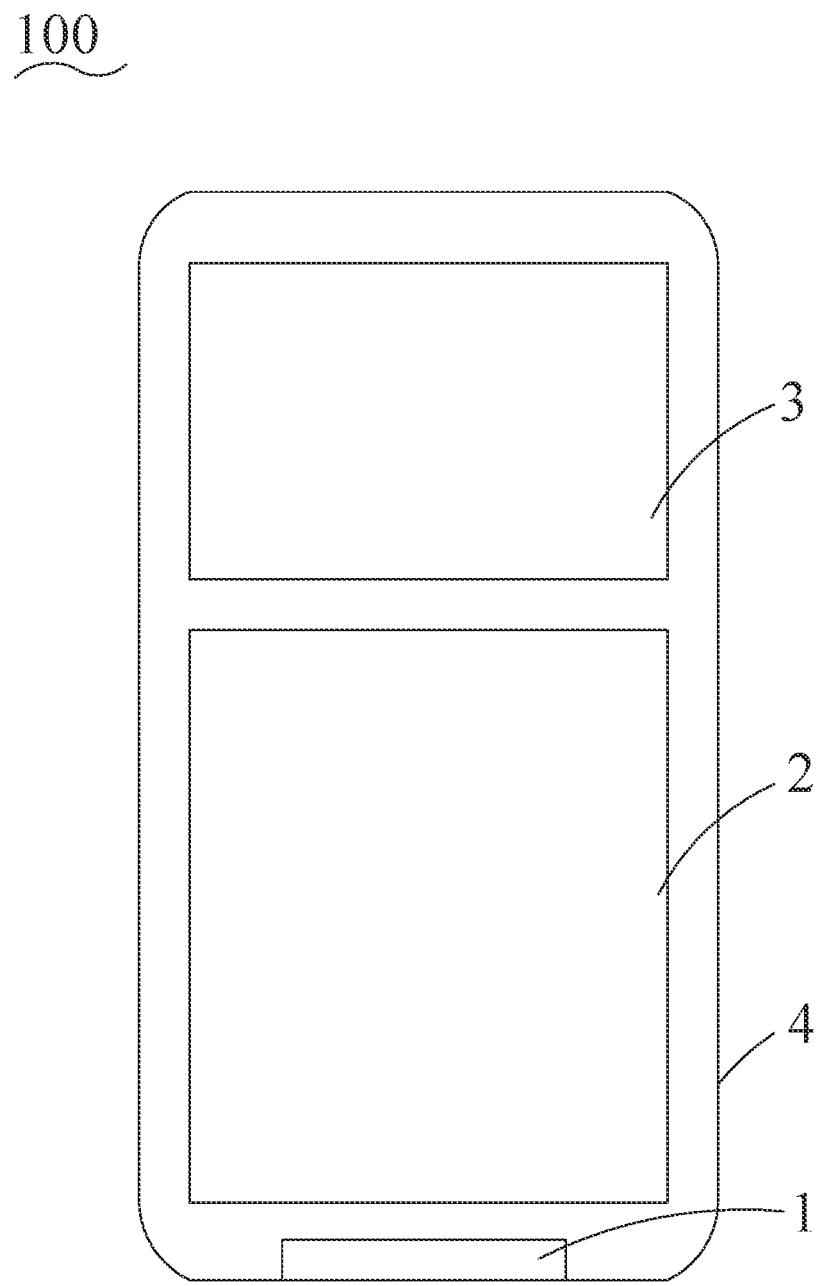
FIG. 1 illustrates a structure of an electronic terminal in accordance with an exemplary embodiment of the present invention.

Please refer to FIG. 1. The electronic terminal 100 comprises a housing 4, a circuit board 3, a battery 2 and a sensor package 1.

Wherein, the housing 4 is used to form the outer contour of the electronic terminal 100, so as to accommodate the electronic devices and functional components of the electronic terminal 100, and at the same time form a sealing and protective effect on the electronic devices and functional components inside the electronic terminal 100.

The circuit board 3 is installed inside the housing 4. The circuit board 3 can be used as the main board of the electronic terminal 100. A grounding point is provided on the circuit board 3 to realize the grounding of the circuit board 3. The circuit board 3 can be provided and integrated with one, two or more of functional components such as a motor, a microphone, a speaker, a receiver, a headphone interface, a universal serial bus interface (USB interface), a camera, a gyroscope, and a processor.

The battery 2 is installed inside the housing 4. Battery 2 is connected to circuit board 3 to realize battery 2 powering electronic terminal 100. Wherein, a power management circuit may be provided on the circuit board 3. The power management circuit is used to distribute the voltage provided by battery 2 to the various electronic devices in the electronic terminal 100.

The sensor package 1 is installed inside the housing 4. The sensor package 1 senses external sound or air pressure, and converts the external sound or air pressure into electrical signals.

Figure 2:
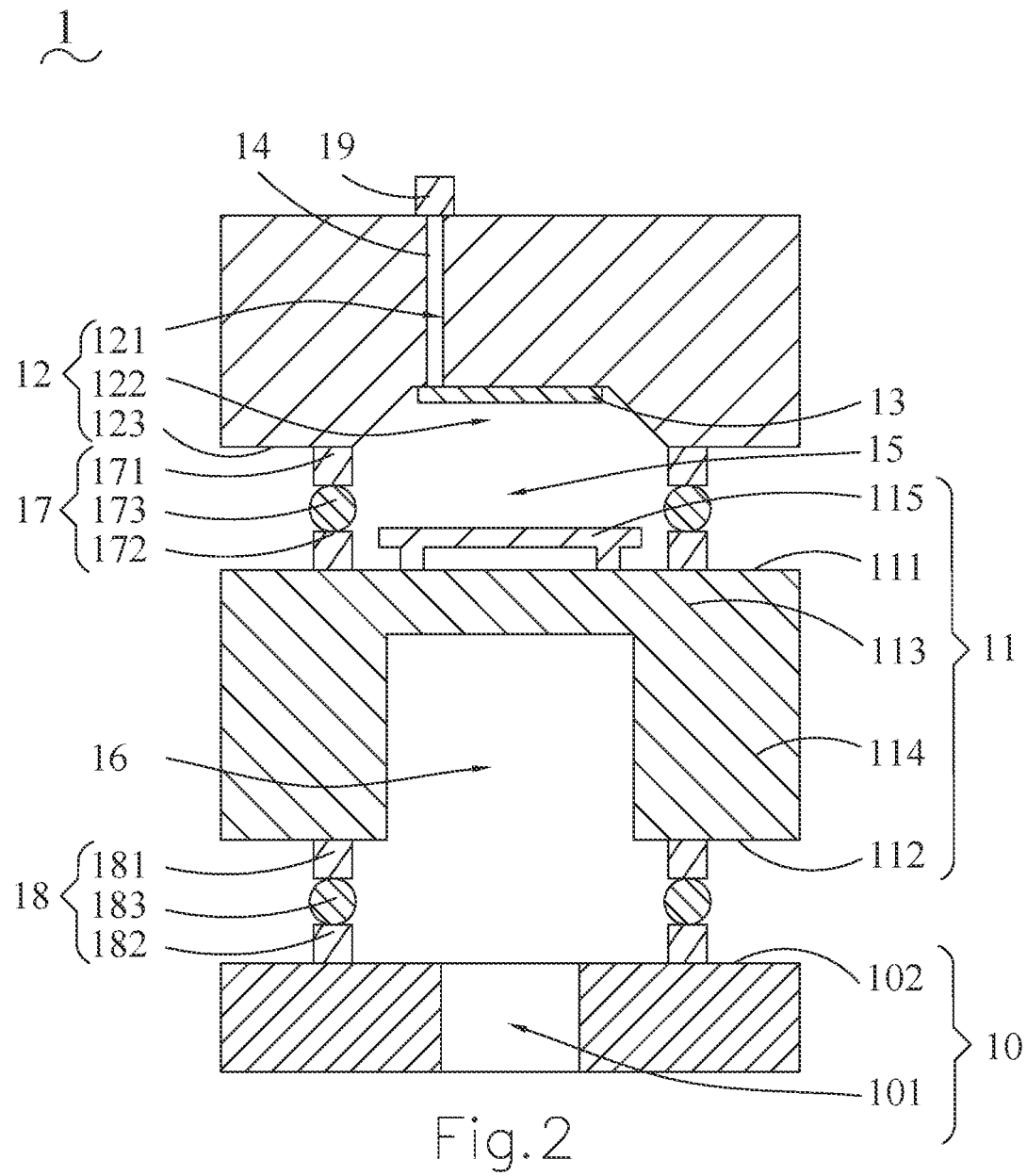
FIG. 2 is a cross-sectional view of a sensor package of a first structure, in accordance with the embodiment of the present invention.

Please refer to FIG. 2. The sensor package 1 comprises a package cover 10, an electro-acoustic conversion chip 11 fixed to the package cover 10, and a processing chip 12 fixed to the surface of one side of the electro-acoustic conversion chip 11 away from the package cover 10 and electrically connected to the electro-acoustic conversion chip 11, a suction structure 13 and an electrical connector 14 that is electrically connected to the suction structure 13 and that activates the suction structure 13.

The processing chip 12 is provided with a first through hole 121 that connects the first cavity 15 with the outside. The electrical connector 14 that activates the suction structure 13 is at least partially accommodated in the first through hole 121. In this embodiment, the processing chip 12 is provided with a groove 122 whose opening faces the electro-acoustic conversion chip 11. The suction structure 13 is set in the groove 122. The processing chip 12 and the electro-acoustic conversion chip 11 are connected to form a first cavity 15. The suction structure 13 is used to absorb the air in the first cavity 15. The package cover 10 and the electro-acoustic conversion chip 11 are connected to form a second cavity 16. The package cover 10 is provided with a second through hole 101 communicating with the second cavity 16.

Wherein, the processing chip 12 fixed to the package cover 10 may be an application specific integrated circuit (ASIC, Application Specific Integrated Circuit) or an integrated circuit (IC, Integrated Circuit). It can be understood that the application specific integrated circuit may also be referred to as a special integrated chip. The electro-acoustic conversion chip 11 may be a microelectronic mechanical chip. It can be understood that the processing chip 12 is electrically connected to the electro-acoustic conversion chip 11. After the electro-acoustic conversion chip 11 converts the mechanical signal to an electrical signal, the processing chip 12 accepts the electrical signal for subsequent processing.

The sensor package 1 also comprises a suction structure 13, the suction structure 13 can be a getter film, a getter device, etc. For example, when the suction structure 13 is a getter film, the getter film is grown on the processing chip 12 by a physical deposition process. The physical deposition method may be evaporation or sputtering.

Wherein, if the suction structure 13 is a getter film, the material of the getter film is a metal, and the metal element can be an element belonging to Group IVB and Group VB from Periodic Table of Elements, a single element composed of a single metal element, or two elements. an alloy composed of two or more metal elements, such as titanium, zirconium, or titanium-zirconium alloy.

The sensor package 1 also comprises an electrical connector 14 that activates the suction structure 13, and the electrical connector 14 can be an electrode. The processing chip 12 is provided with a first through hole 121. The electrical connector 14 is arranged in the first through hole 121. The electrical connector 14 is electrically connected to the suction structure 13.

Wherein, the external circuit supplies power to each electrical connector 14, and the electrical connector 14 is connected to the suction structure 13. When current flows through the suction structure 13, the electrical energy is converted into heat energy to activate the suction structure 13. It can be understood that when the electrical connector 14 is provided to supply power to the suction structure 13, when the air inside the sensor package 1 needs to be absorbed, the suction structure 13 can be activated through the electrical connector 14 to make the suction structure 13 absorb air. Through the setting of the external circuit, power can be supplied to the electrical connector 14 multiple times. It is understandable that the suction structure 13 can be activated multiple times in this way to ensure the vacuum environment and service life of the sensor.

In some embodiments, multiple first through holes 121 may be provided, and multiple electrical connectors 14 are connected to the suction structure 13 to activate the suction structure 13 more effectively.

Wherein, a fifth soldering pad 19 can be deposited on the processing chip 12, and an electrical connector 14 is provided for each of the first through hole 121. The electrical connector 14 comprises a first end and a second end. The first end is electrically connected to the suction structure 13. The second end is connected to fifth soldering pad 19. It can be understood that the fifth soldering pad 19 can be used as an interface for an external circuit.

A groove 122 is formed on the processing chip 12. The opening of the groove 122 faces the electro-acoustic conversion chip 11. The groove 122 is integrated with the first cavity 15, and the suction structure 13 is arranged in the groove 122.

Wherein, the method of forming groove 122 can be etching. Etching refers to the purposeful removal of unnecessary materials from the surface of processing chip 12 through chemical or physical methods. The purpose of etching processing chip 12 is mainly to accommodate the suction structure 13.

Wherein, the cross section of groove 122 can be straight, zigzag, or wavy, which is used to increase the contact area of the suction structure 13. As the area of the suction structure 13 increases, the suction effect of the first cavity 15 is improved, and the vacuum environment and service life of the sensor package 1 can be prolonged.

The package cover 10 is provided with a second through hole 101 connected with the second cavity 16. The second through hole 101 serves as a channel for sensing external sound or air pressure. It is understandable that external sound or air pressure enters through the second through hole 101 and acts on the sensor structure 115 set on the electro-acoustic conversion chip 11. The sensor structure 115 converts external sound or air pressure into electrical signals and transmits them to the processing chip 12.

The package cover 10 has a certain thickness. the thickness of the package cover 10 and the size of the second through hole 101 can be adjusted to finally adjust properties such as the acoustic response of the sensor package 1.

In the description of the present invention, it should be understood that terms such as "first" and "second" are only used to distinguish similar objects, and cannot be understood as indicating or implying relative importance or implicitly indicating the indicated technology the number of features.

The sensor package 1 provided by the present invention comprises a package cover 10, an electro-acoustic conversion chip 11 fixed to the package cover 10, a processing chip 12 fixed on the surface of one side of the electro-acoustic conversion chip 11 away from the package cover 10 and electrically connected to the electro-acoustic conversion chip 11, a suction structure 13, and an electrical connector 14 which is electrically connected to the suction structure 13. The processing chip 12 is provided with a first through hole 121. The electrical connector 14 is provided in the first through hole 121. The processing chip 12 is provided with a groove 122 whose opening faces the electro-acoustic conversion chip 11. The suction structure 13 is set in the groove 122. The processing chip 12 and the electro-acoustic conversion chip 11 are connected to form a first cavity 15. The suction structure 13 is used to absorb the air in the first cavity 15. The package cover 10 and the electro-acoustic conversion chip 11 are connected to form a second cavity 16. The package cover 10 is provided with a second through hole 101 communicating with the second cavity 16. The suction structure 13 is used to absorb the air in the first cavity 15 to form a vacuum state in the first cavity 15 so that the intermolecular collisions in the first cavity 15 are weakened. The air resistance of the movable parts of the electro-acoustic conversion chip 11 when vibrating is reduced, and the air damping and noise in the first cavity 15 are reduced, thereby improving the performance of the sensor including the signal-to-noise ratio.

Please continue to refer to FIG. 2. The sensor package 1 also comprises a first connection structure 17. The first connection structure 17 is a conductor structure, and the first connection structure 17 may include a first sub-connection structure, a second sub-connection structure, and a third sub-connection structure. The processing chip 12 comprises a first perimeter 123 surrounding the groove 122. The first sub-connection structure is connected to the first perimeter 123. The electro-acoustic conversion chip 11 comprises a second perimeter 111 set opposite to the first perimeter. The second sub-connection structure is connected to the second perimeter 111, and the first sub-connection structure and the second sub-connection structure are connected through the third sub-connection structure.

Wherein, the first sub-connection structure can be a first soldering pad 171. The second sub-connection structure can be a second soldering pad 172. The third sub-connection structure can be a first solder 173. It is understandable that the first sub-connection structure, second sub-connection structure, and third sub-connection structure can also be realized by other structures or materials.

Wherein, the first soldering pad 171 can be deposited on the processing chip 12 by metallization of the bonding area. The bonding area refers to the area where there is a concentration of charge density between the atoms that are bonded to each other In this charge density concentration area, the accumulation of electronic charges makes the electrons attracted by multiple nuclei at the same time to form chemical bonds. In this way, the first perimeter 123 and the first soldering pad 171 are connected.

It is understandable that the second sub-connection structure can also be deposited on the electro-acoustic conversion chip 11 by metallization of the bonding area described above. The electro-acoustic conversion chip 11 comprises a second perimeter 111, so as to realize the connection between the second perimeter 111 and the second sub-connection structure.

The third sub-connection structure can be deposited on the first sub-connection structure or the second sub-connection structure by chemical methods such as electroplating; then, the first sub-connection structure and the second sub-connection structure are aligned and connected. The connection method can adopt bonding technology, which is to clean the surface. Two atomically flat materials undergo surface cleaning or activation treatment, and a technology is used to integrates materials through atomic force. For example, when the third sub-connection structure is deposited on the first sub-connection structure, the second sub-connection structure and the third sub-connection structure are integrated by atomic force. Or, when the third sub-connection structure is deposited on the second sub-connection structure, the first sub-connection structure and the third sub-connection structure can be integrated by atomic force.

The sensor package 1 also comprises a second connection structure 18. The electro-acoustic conversion chip 11 comprises a third perimeter 112 set opposite to the first perimeter 123. The third perimeter 112 and the second perimeter 111 are located on opposite sides of the electro-acoustic conversion chip 11 respectively. The package cover 10 comprises a fourth perimeter 102. The second connection structure 18 and the electro-acoustic conversion chip 11 are enclosed together to form a second cavity 16.

Since the second connection structure 18 is made of metal, it can be understood that the package cover 10 and the acoustic conversion chip 11 can be electrically connected through the second connection structure 18.

The second connection structure 18 comprises a fourth sub-connection structure, a fifth sub-connection structure and a sixth sub-connection structure. The fourth sub-connection structure is connected to the electro-acoustic conversion chip 11. The fifth sub-connection structure is connected to package cover 10. The fourth sub-connection structure and fifth sub-connection structure are connected through the sixth sub-connection structure.

Wherein, the fourth sub-connection structure can be a third soldering pad 181. The fifth sub-connection structure can be a fourth soldering pad 182. The sixth sub-connection structure can be a second solder 183.

The fourth sub-connection structure and fifth sub-connection structure can be deposited on the electro-acoustic conversion chip 11 and the package cover 10 respectively by metallization of the bonding area. The sixth sub-connection structure can be deposited on the fourth sub-connection structure or fifth sub-connection structure by chemical methods such as electroplating. Wherein, formation method of the fourth sub-connection structure and the fifth sub-connection structure is the same way as the above-mentioned formation method of the second sub-connection structure. The formation method of the sixth sub-connection structure is the same as the formation method of the third sub-connection structure mentioned above, and will not be repeated here.

The electro-acoustic conversion chip 11 comprises a main body 113 and a sidewall 114. The sidewall 114 is connected to the periphery of the main body 113. The main body 113 and the sidewall 114 are connected to form a third cavity. By adjusting the thickness of the main body 113 and the size of the third cavity, the acoustic response of the device can also be adjusted.

In some embodiments, please continue to refer to FIG. 2, the main body 113 is connected to the first connection structure 17. The sidewall 114 is connected to the second connection structure 18. It can be understood that the main body 113, the first connection structure 17 and the processing chip 12 form a first cavity 15. The sidewall 114, the second connection structure 18 and the package cover 10 form a second cavity 16. Wherein, a sensor structure 115 is provided on the electro-acoustic conversion chip 11. The sensor structure 115 is located in the first cavity 15.

Figure 3:
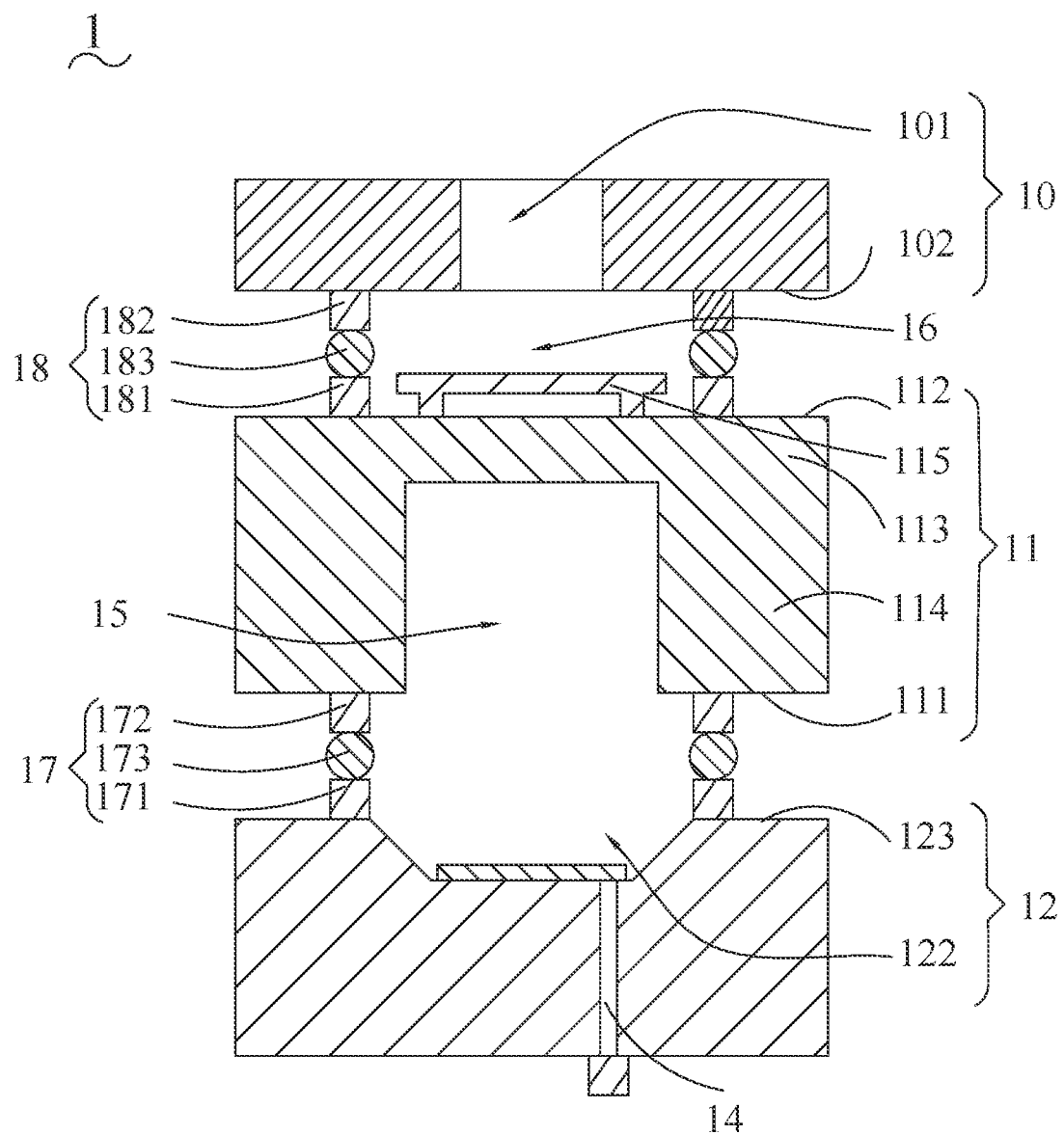
FIG. 3 is a cross-sectional view of a sensor package of a second structure.

In some embodiments, please refer to FIG. 3, FIG. 3 is a schematic view of the second structure of the sensor package provided by the present invention.

The main body 113 is connected to the second connection structure 18. The sidewall 114 is connected to the first connection structure 17. It can be understood that the sidewall 114, the first connection structure 17 and the processing chip 12 form the first cavity 15. The main body 113, the second connection structure 18 and the package cover 10 form a second cavity 16. Wherein, a sensor structure 115 is provided on the electro-acoustic conversion chip 11. The sensor structure 115 is located in the second cavity 16.

In the prior art, the traditional sensor package is packaged with a metal shell and a ceramic shell. The packaging process is more complicated and the cost is higher. Wherein, the electro-acoustic conversion chip and processing chip are attached to the packaging substrate. The housing and the packaging substrate form a packaging cavity, and a through hole is arranged on the packaging substrate. As a channel for sensing external sound or air pressure, the electro-acoustic conversion chip and the processing chip are connected by metal wires. The processing chip is covered with sealing glue, which is used to resist the external environment temperature, humidity, static electricity, heat, and particulate matter.

In the sensor package 1 provided by the present invention, power is supplied to the suction structure 13 by the electrical connector 14 which activates the suction structure 13 Thereby, the suction structure 13 is activated and the air in the first cavity 15 is absorbed, which effectively improves the vacuum in the packaging cavity and reduces the damping of the packaging cavity. In addition, the electro-acoustic conversion chip 11 and the processing chip 12 in the sensor package 1 are stacked together and are connected through the first connection structure 17 and the second connection structure 18. It is not needed to occupy more packaging area respectively, so the packaging volume of the device is greatly reduced, which is conducive to the miniaturization of the electronic terminal.

The embodiment of the present application also provides a method for manufacturing the sensor package 11. The manufacturing method of the sensor package is used to produce the sensor package 1. The sensor package 1 can be used for the above-mentioned electronic terminal 100. In the following methods, the order can be adjusted appropriately under appropriate conditions.

Figure 4:
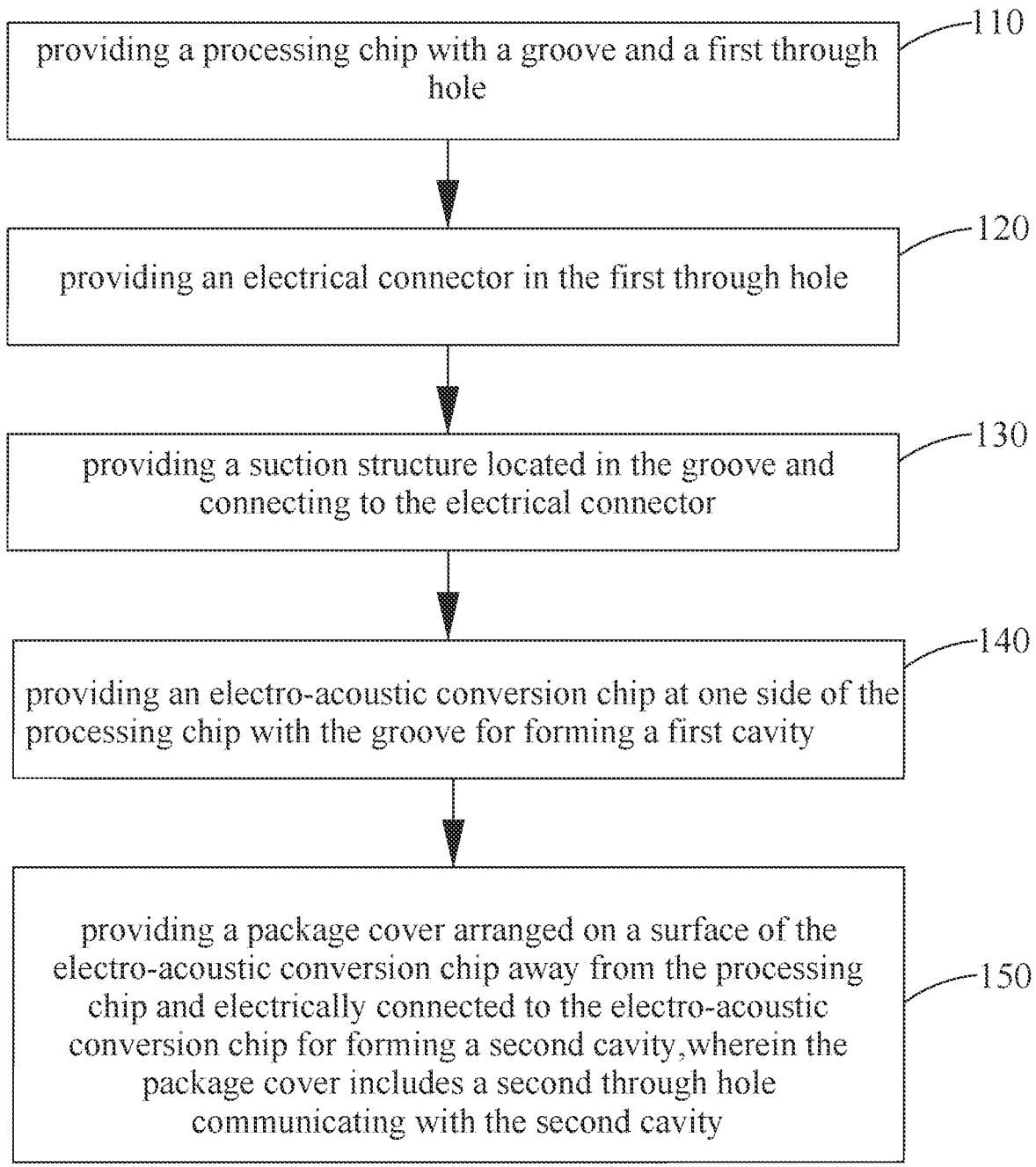
FIG. 4 is a flow chart of a method for making the sensor package of the present invention.

Please refer to FIG. 4, which is a schematic process chart of the method for manufacturing the sensor package 1 provided by the present invention. The manufacturing method of the sensor package 1 comprises the following steps:

S110, a processing chip 12 is provided, and a groove 122 and a first through hole 121 are formed on the processing chip 12.

Figure 5:
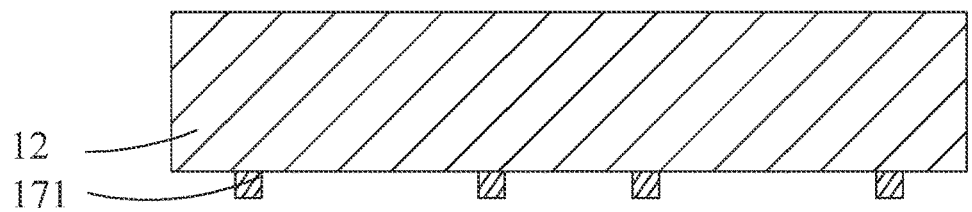
FIG. 5 illustrates a first form of the sensor package during manufacture.

Wherein, in the manufacturing process of the sensor package 1, a processing chip 12, such as the processing chip 12 shown in FIG. 5, is first provided.

Figure 6:
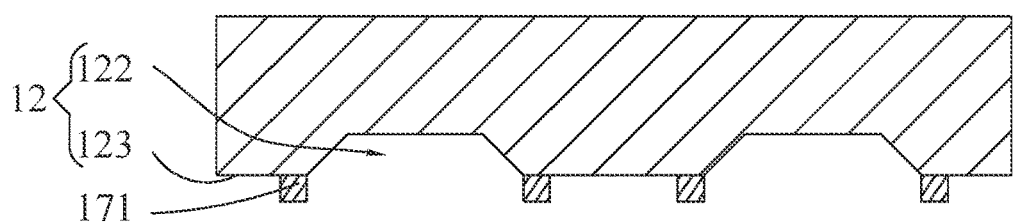
FIG. 6 illustrates a second form of the sensor package during manufacture.

The processing chip 12 is used to process the electrical signal transmitted by the electro-acoustic conversion chip 11. It can be understood that a groove 122 is formed on the processing chip 12 by etching. The cross section of the groove 122 may be a straight line, a wave shape or other irregular shapes. The irregular cross-sectional shape increases the surface area of the groove 122. The increased surface area can accommodate more of the suction structure 13. In this way, the suction structure 13 absorbs the air in the first cavity 15 more thoroughly, and the vacuum degree is higher, as shown in the groove 122 in FIG. 6.

Figure 7:
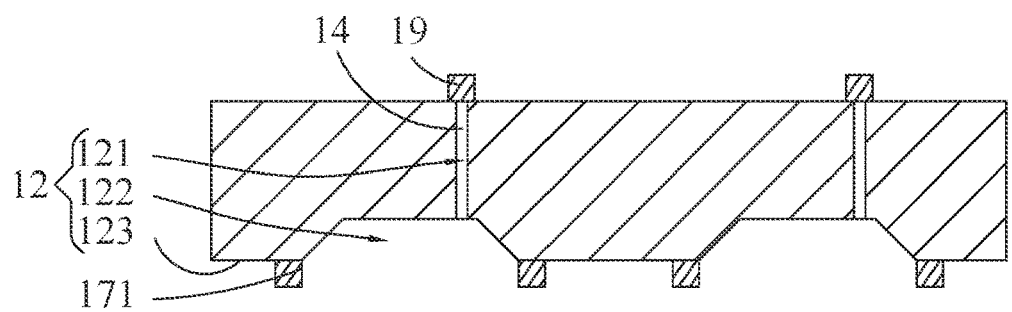
FIG. 7 illustrates a third form of the sensor package during manufacture.

Wherein, the method for forming at least the first through hole 121 may be a process such as TSV. The TSV process is filling the conductive materials such as copper, tungsten, polysilicon, etc., to achieve vertical electrical interconnection of silicon through holes. The first through hole 121 as shown in FIG. 7.

S120. Provide an electrical connector 14. The electrical connector is set in the first through hole 121.

Figure 8:
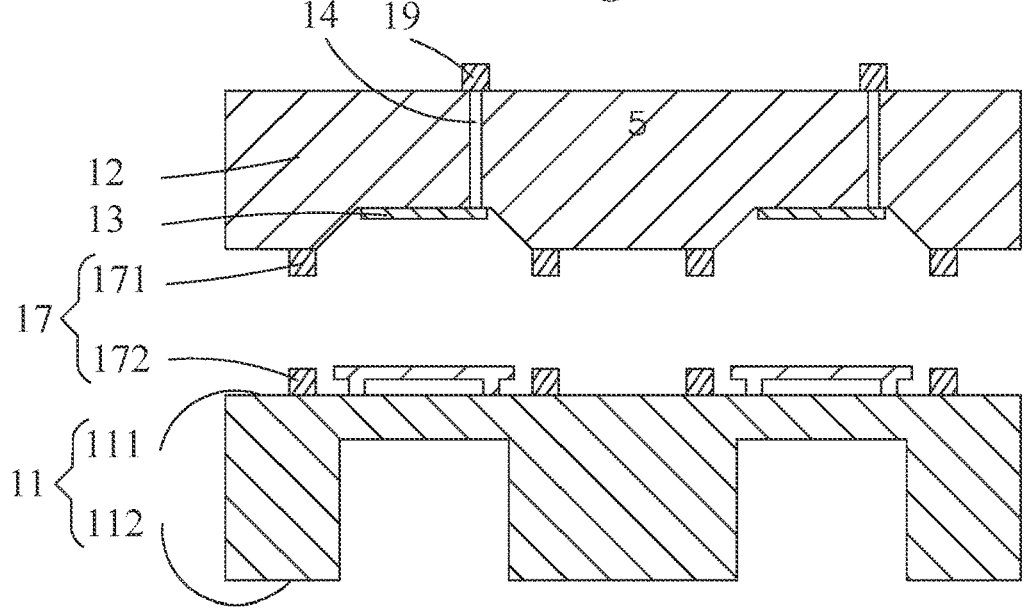
FIG. 8 illustrates a fourth form of the sensor package during manufacture.

Wherein, at least one electrical connector 14 is provided. Each electrical connector 14 is filled in the first through hole 121 described above. It can be understood that the electrical connector 14 can be directly connected to an external circuit. The external circuit supplies power to the electrical connector 14, or it can be connected to structure of the fifth soldering pad 19. The external circuit supplies power to the electrical connector 14 through the fifth soldering pad 19. The electrical connector 14 as shown in FIG. 8.

Wherein, the fifth soldering pad 19 can be formed on the processing chip 12 through a deposition process. The fifth soldering pad 19 as shown in FIG. 8.

S130. a suction structure 13 is provided, the suction structure 13 is set in the groove 122, and the suction structure 13 is connected to the electrical connector 14.

Wherein, in the production process of sensor package 1, another suction structure 13 is provided, as shown in FIG. 7.

Wherein, the suction structure 13 and the electrical connector 14 are electrically connected.

S140. an electro-acoustic conversion chip 11 is provided. The electro-acoustic conversion chip 11 is connected to the side of the processing chip 12 where a groove is provided, so that the electro-acoustic conversion chip 11 and the processing chip 12 are enclosed together to form a first cavity 15.

Figure 9:
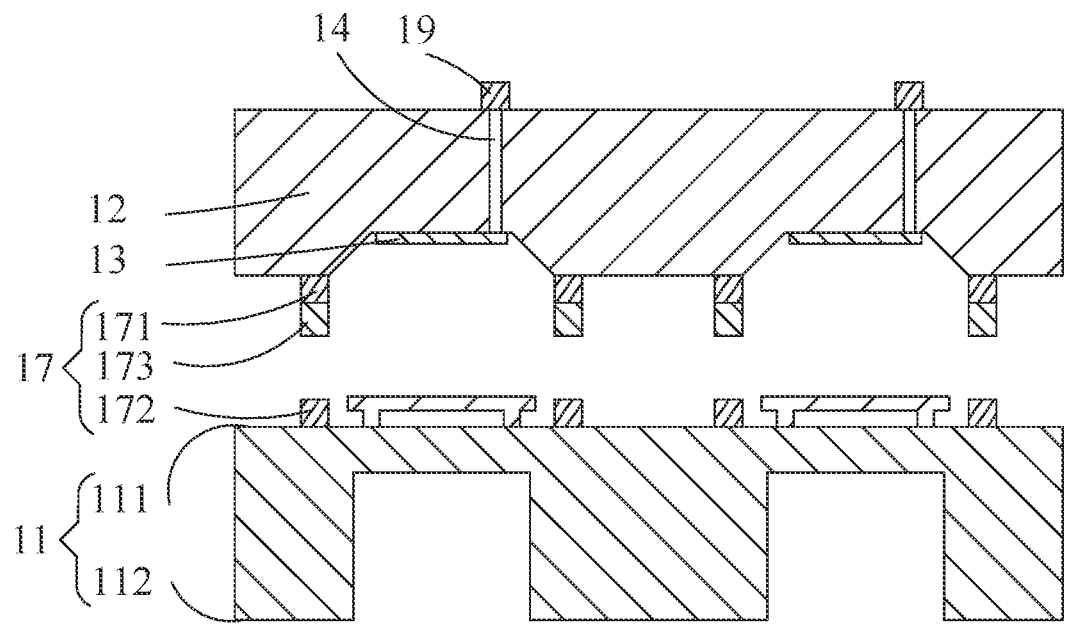
FIG. 9 illustrates a fifth form of the sensor package during manufacture.
Figure 10:
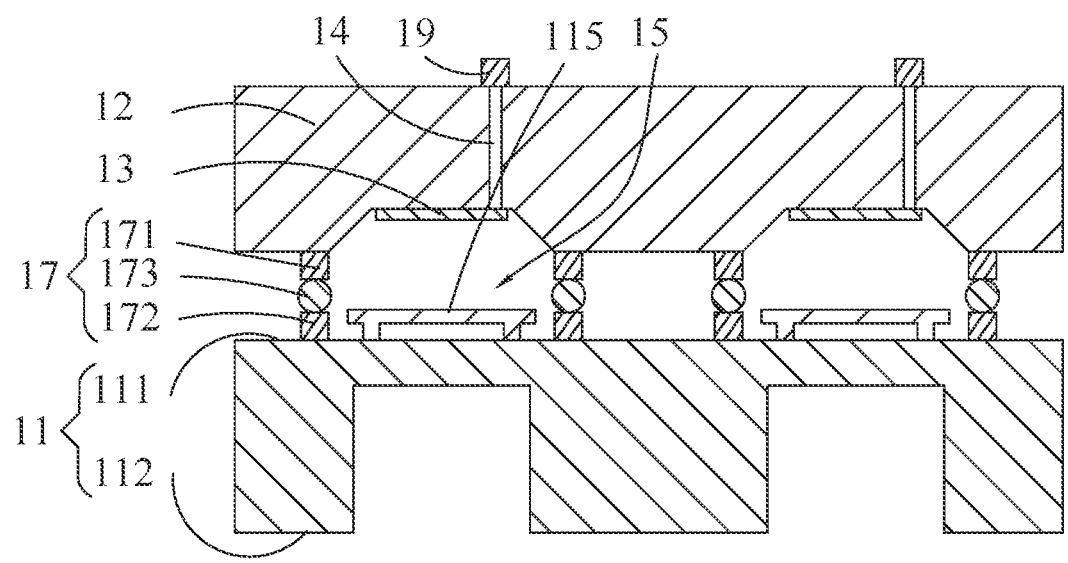
FIG. 10 illustrates a sixth form of the sensor package during manufacture.

Wherein, in the manufacturing process of the sensor package 1, an electro-acoustic conversion chip 11 is provided, such as the electro-acoustic conversion chip 11 shown in FIGS. 8-10.

S150. a package cover 10 is provided. The package cover 10 is arranged on the surface of the electro-acoustic conversion chip 11 at the side away from the processing chip 12 and is electrically connected to the electro-acoustic conversion chip 11. The package cover 10 and the electro-acoustic conversion chip 11 are jointly enclosed as a second cavity 16. The package cover 10 is provided with a second through hole 101 communicating with the second cavity 16.

Figure 11:
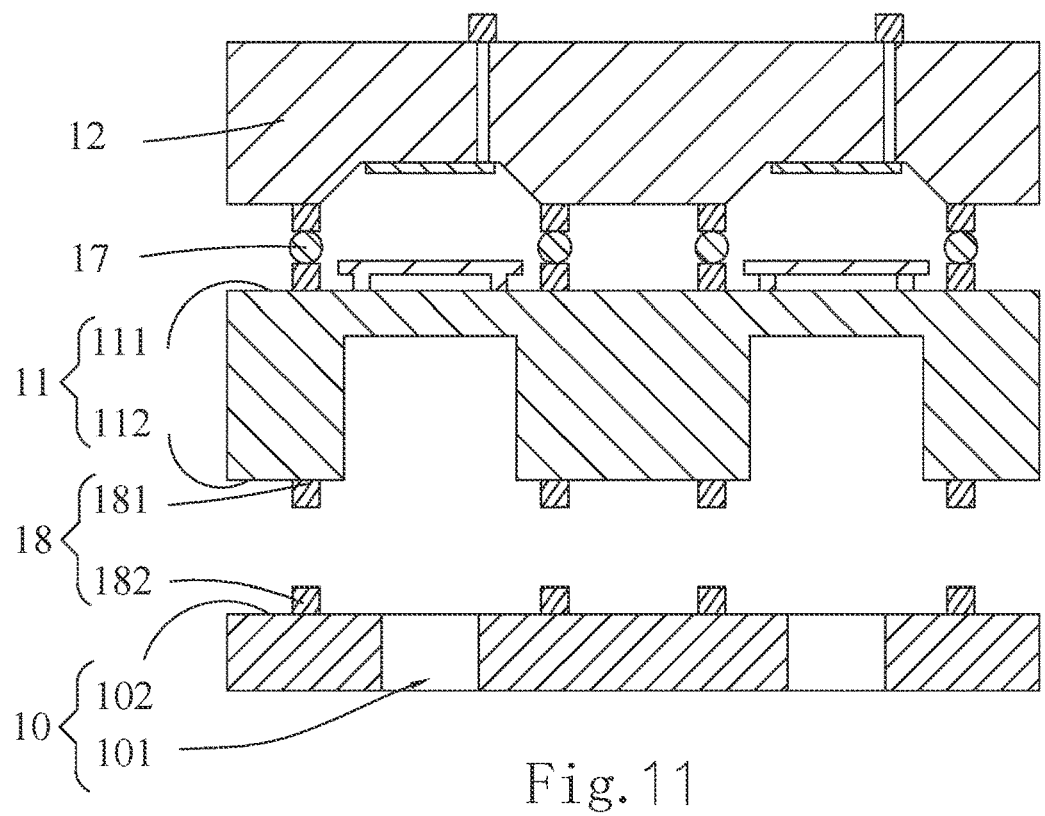
FIG. 11 illustrates a seventh form of the sensor package during manufacture.
Figure 12:
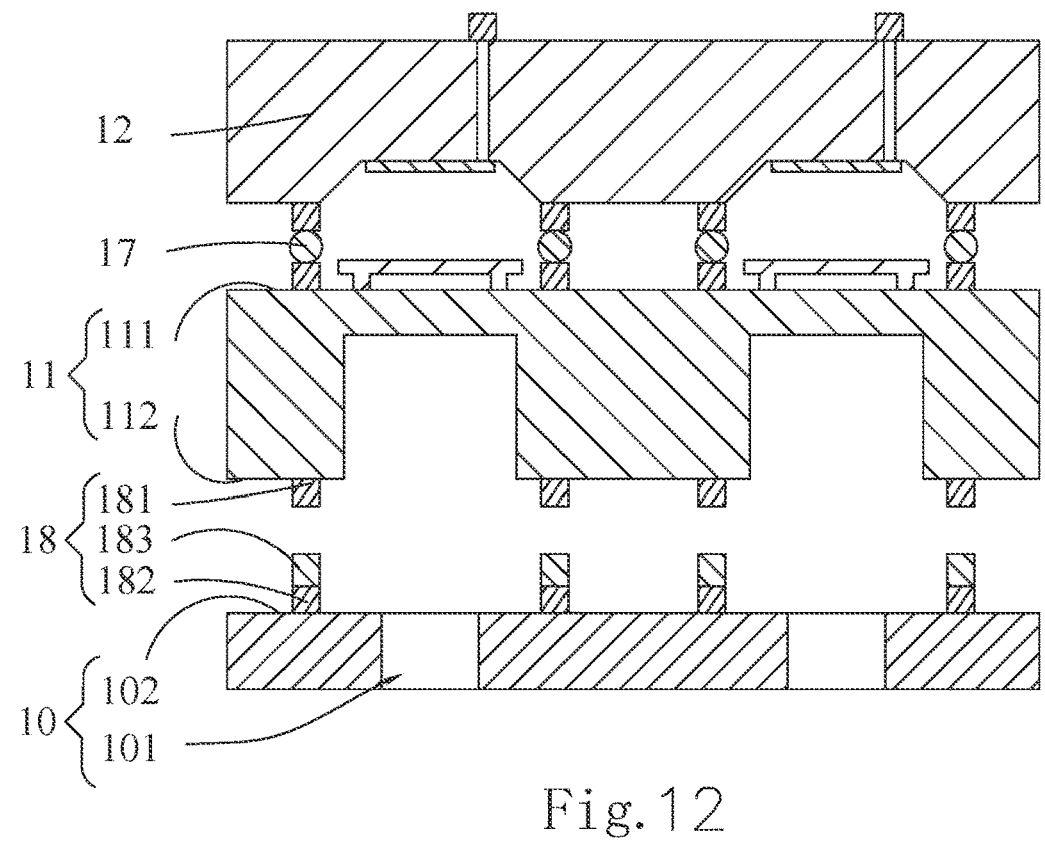
FIG. 12 illustrates an eighth form of the sensor package during manufacture.
Figure 13:
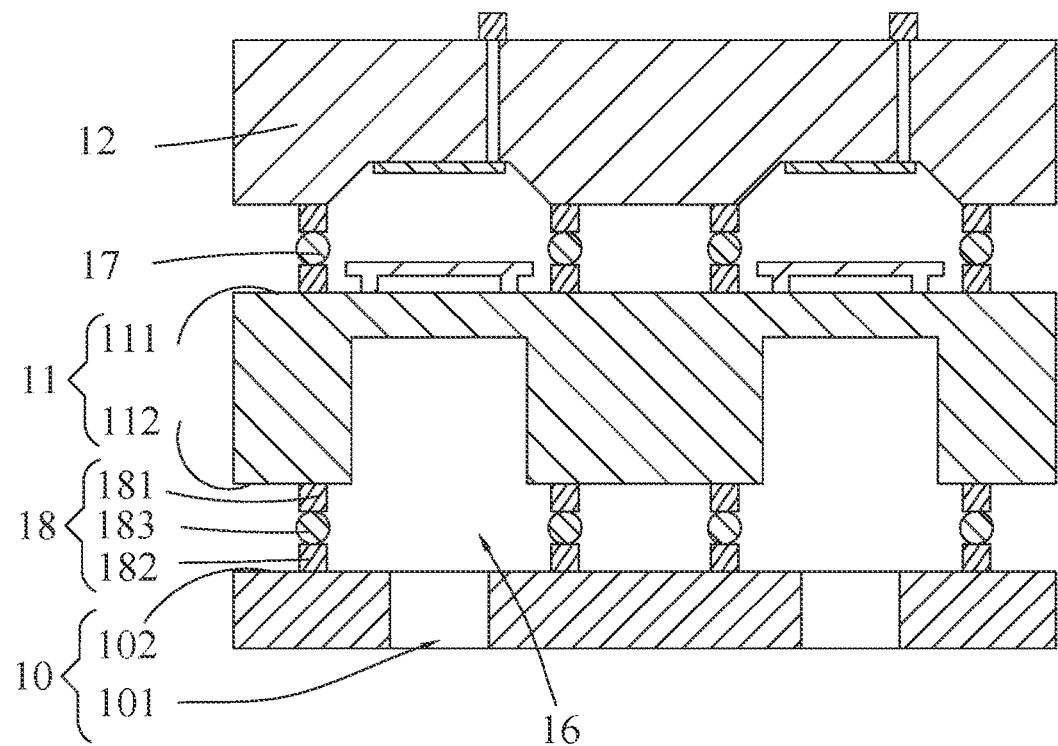
FIG. 13 illustrates a ninth form of the sensor package during manufacture.

Wherein, in the manufacturing process of the sensor package 1, a package cover 10 is provided, such as the package cover 10 shown in FIGS. 11 to 13.

In some embodiments, as shown in FIGS. 8 to 10, after step S140, after providing an electro-acoustic conversion chip 11, the following steps are further included:

Provide a first connection structure 17. Connect the first connection structure 17 to the first perimeter 123 and the second perimeter 111 respectively. The processing chip 12, the electro-acoustic conversion chip 11, and the first connection structure 17 are enclosed together to form the first cavity 15.

Wherein, the processing chip 12 comprises a first perimeter 123 surrounding the groove 122. The electro-acoustic conversion chip 11 comprises a second perimeter 111. The second perimeter 111 is set opposite to the first perimeter 123. After obtaining the processing chip 12 and the electro-acoustic conversion chip 11, the first connection structure is formed in the first perimeter 123. The first connection structure comprises a first sub-connection structure, a second sub-connection structure and a third sub-connection structure. The first sub-connection structure can be the first soldering pad 171. The second sub-connection structure can be a second soldering pad 172. The third sub-connection structure can be a first solder 173.

Wherein, the formation method of the first sub-connection structure and the second sub-connection structure may be to deposit the first sub-connection structure and the second sub-connection structure by metallization of the bonding area. Thus, the first perimeter 123 is connected with the first sub-connection structure, and the second perimeter 111 is connected with the second sub-connection structure.

Wherein, the third sub-connection structure is deposited by electroplating on the first sub-connection structure or the second sub-connection structure. For example, the third sub-connection structure is deposited by electroplating on the first sub-connection structure. Then the third sub-connection structure and the second sub-connection structure are aligned and bonded to form a first cavity 15. Or deposit the third sub-connection structure by electroplating on the second sub-connection structure. Then the first sub-connection structure and the third sub-connection structure are aligned and bonded to form the first cavity 15.

In some embodiments, as shown in FIG. 11 to FIG. 13, after step S150, a package cover 10 is provided, the following steps are further included:

Provide a second connection structure 18, and connect the second connection structure 18 to the third perimeter 112 and the fourth perimeter 102 respectively. Thus, the package cover 10, the electro-acoustic conversion chip 11, and the second connection structure 18 are jointly enclosed to form a second cavity 16.

Wherein, the electro-acoustic conversion chip 11 comprises a third perimeter 112 that is located on opposite sides of the electro-acoustic conversion chip 11 with the second perimeter 111. The package cover 10 comprises a fourth perimeter 102 surrounding the second through hole 101. The second connection structure 18 is formed in the third perimeter 112. The second connection structure 18 comprises a fourth sub-connection structure, a fifth sub-connection structure and a sixth sub-connection structure. The fourth sub-connection structure can be the third soldering pad 181. The fifth sub-connection structure can be a fourth soldering pad 182. The sixth sub-connection structure can be a second solder 183.

Wherein, the formation method of the fourth sub-connection structure and fifth sub-connection structure can be to deposit the fourth sub-connection structure and fifth sub-connection structure by metallization of the bonding area. Thus, the third perimeter 112 is connected with the fourth sub-connection structure, and the fourth perimeter 102 is connected with the fifth sub-connection structure.

Wherein, the sixth sub-connection structure is deposited by electroplating on the fourth sub-connection structure or fifth connection structure. For example, the sixth sub-connection structure is deposited on the fourth sub-connection structure by electroplating. Then the fourth sub-connection structure and the sixth sub-connection structure are aligned and bonded to form the first cavity 15. Or the sixth sub-connection structure is deposited by electroplating on the fifth sub-connection structure. Then the fifth sub-connection structure and the sixth sub-connection structure are aligned and bonded to form the second cavity 16.

Figure 14:
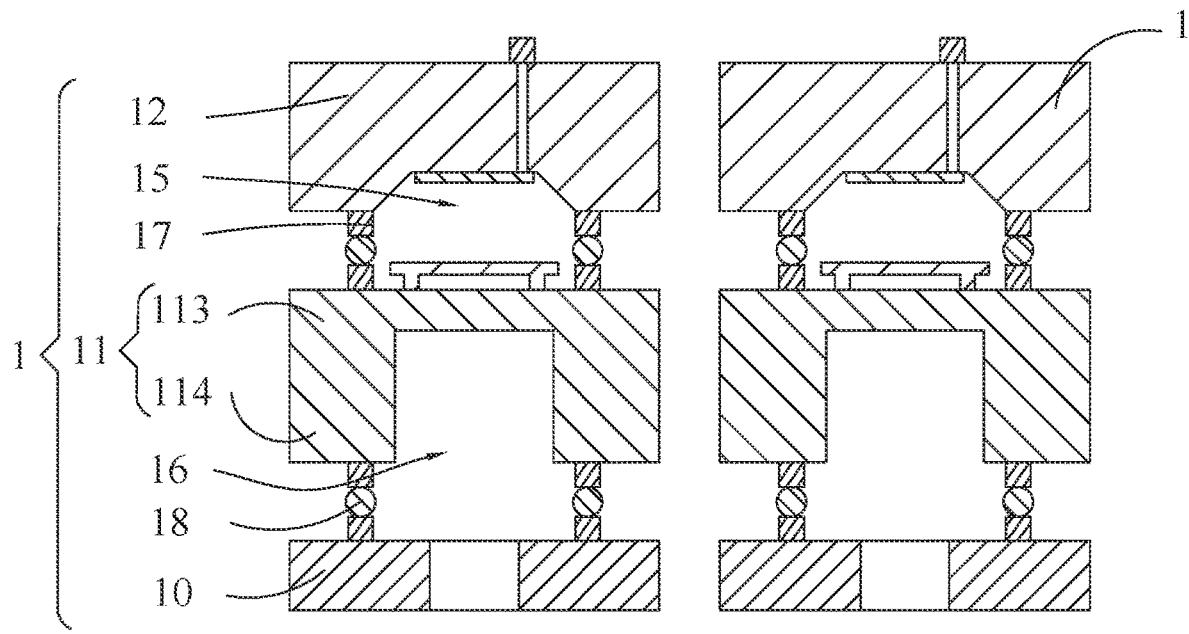
FIG. 14 illustrates a tenth form of the sensor package during manufacture.

In some embodiments, as shown in FIG. 14.

In the process of making batches of the sensor package 1, it can finally be divided into independent sensor package 1. Each sensor package 1 can be used individually in different electronic terminals.

In some embodiments, as shown in FIG. 14.

The electro-acoustic conversion chip 11 comprises a main body 113 and a sidewall 114. The main body 113 is connected to the sidewall 114. The main body 113, the first connection structure 17 and the processing chip 12 are connected to form the first cavity 15. The sidewall 114, the second connection structure 18 and the package cover 10 are connected to form the second cavity 16.

Figure 15:
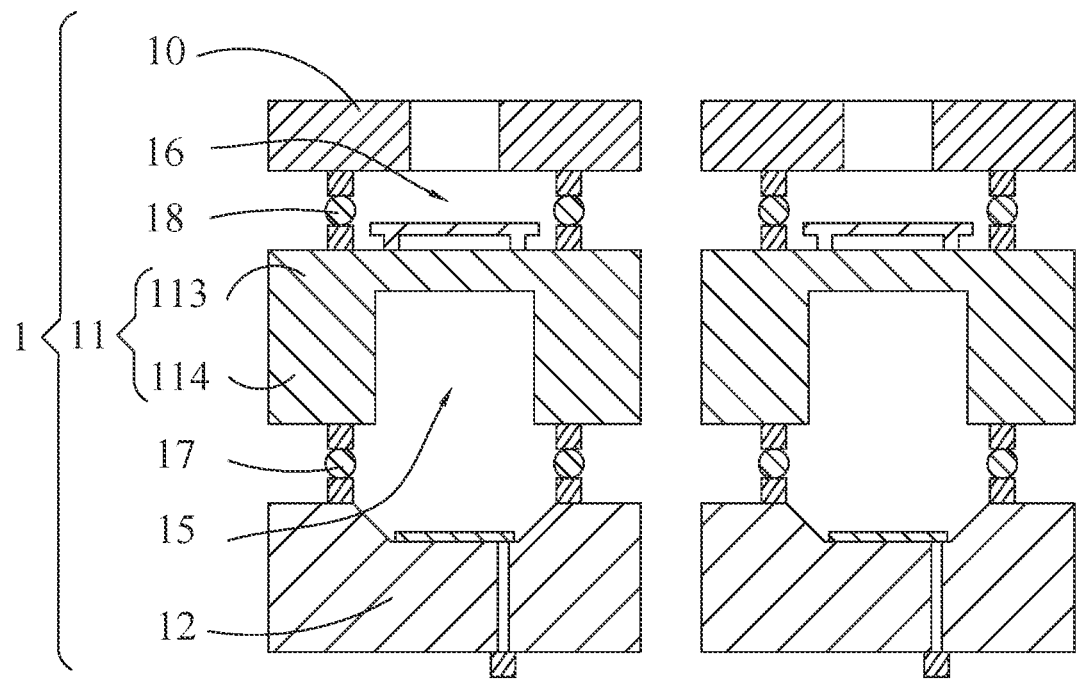
FIG. 15 illustrates an eleventh form of the sensor package during manufacture.

In some embodiments, as shown in FIG. 15.

The sidewall 114, the first connection structure 17 and the processing chip 12 are connected to form the first cavity 15. The main body 113, the second connection structure 18 and the package cover 10 are connected to form the second cavity 16.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sensor package, comprising:
a package cover;
an electro-acoustic conversion chip fixed to the package cover;
a processing chip fixed on a surface of one side of the electro-acoustic conversion chip away from the package cover and electrically connected to the electro-acoustic conversion chip;
a suction structure;
an electrical connector electrically connected to the suction structure for activating the suction structure;
a first cavity formed by the processing chip and the electro-acoustic conversion chip;
a second cavity formed by the package cover and the electro-acoustic conversion chip;
wherein
the processing chip includes a groove with an opening facing the electro-acoustic conversion chip for accommodating the suction structure, a first through hole communicating with the first cavity and at least partially receiving the electrical connector; the package cover and the acoustic conversion chip are connected to form a second cavity; and
the package cover includes a second through hole communicating with the second cavity.

2. The sensor package as described in claim 1, further including a first connection structure; wherein the processing chip comprises a first perimeter surrounding the groove; the electro-acoustic conversion chip comprises a second perimeter opposite to the first perimeter; the first connection structure is connected to the first perimeter and the second perimeter, respectively; the processing chip, the first connection structure, and the acoustic conversion chip enclose cooperatively for forming the first cavity.

3. The sensor package as described in claim 2 further comprising a second connection structure, wherein the electro-acoustic conversion chip further comprises a third perimeter; the third perimeter and the second perimeter are respectively located on opposite sides of the electro-acoustic conversion chip; the package cover comprises a fourth perimeter surrounding the second through hole; the second connection structure is connected to the third perimeter and the fourth perimeter respectively; the package cover, the second connection structure, and the acoustic conversion chip enclose cooperatively for forming the second cavity.

4. The sensor package as described in claim 3, wherein the electro-acoustic conversion chip comprises a main body connected to the first connection structure, and a sidewall connected to a periphery of the main body for connecting to the second connection structure.

5. The sensor package as described in claim 4, wherein the first connection structure comprises a first soldering pad connected to the processing chip, a second soldering pad connected to the electro-acoustic conversion chip, and a first solder connecting the first soldering pad and the second soldering pad.

6. The sensor package as described in claim 4, wherein the second connection structure comprises a third soldering pad connected with the electro-acoustic conversion chip, a fourth soldering pad connected with the package cover, and a second solder connecting the third soldering pad and the fourth soldering pad.

7. The sensor package as described in claim 3, wherein the electro-acoustic conversion chip comprises a main body connected to the first connection structure, and a sidewall connected to a periphery of the main body for connecting to the first connection structure.

8. The sensor package as described in claim 7, wherein the first connection structure comprises a first soldering pad connected to the processing chip, a second soldering pad connected to the electro-acoustic conversion chip, and a first solder connecting the first soldering pad and the second soldering pad.

9. The sensor package as described in claim 7, wherein the second connection structure comprises a third soldering pad connected with the electro-acoustic conversion chip, a fourth soldering pad connected with the package cover, and a second solder connecting the third soldering pad and the fourth soldering pad.

10. The sensor package as described in claim 3, wherein the first connection structure comprises a first soldering pad connected to the processing chip, a second soldering pad connected to the electro-acoustic conversion chip, and a first solder connecting the first soldering pad and the second soldering pad.

11. The sensor package as described in claim 3, wherein the second connection structure comprises a third soldering pad connected with the electro-acoustic conversion chip, a fourth soldering pad connected with the package cover, and a second solder connecting the third soldering pad and the fourth soldering pad.

12. The sensor package as described in claim 2, wherein the first connection structure comprises a first soldering pad connected to the processing chip, a second soldering pad connected to the electro-acoustic conversion chip, and a first solder connecting the first soldering pad and the second soldering pad.

13. An electronic terminal comprising a sensor package as described in claim 1.

* * * * *